UNITED STATES PATENT OFFICE.

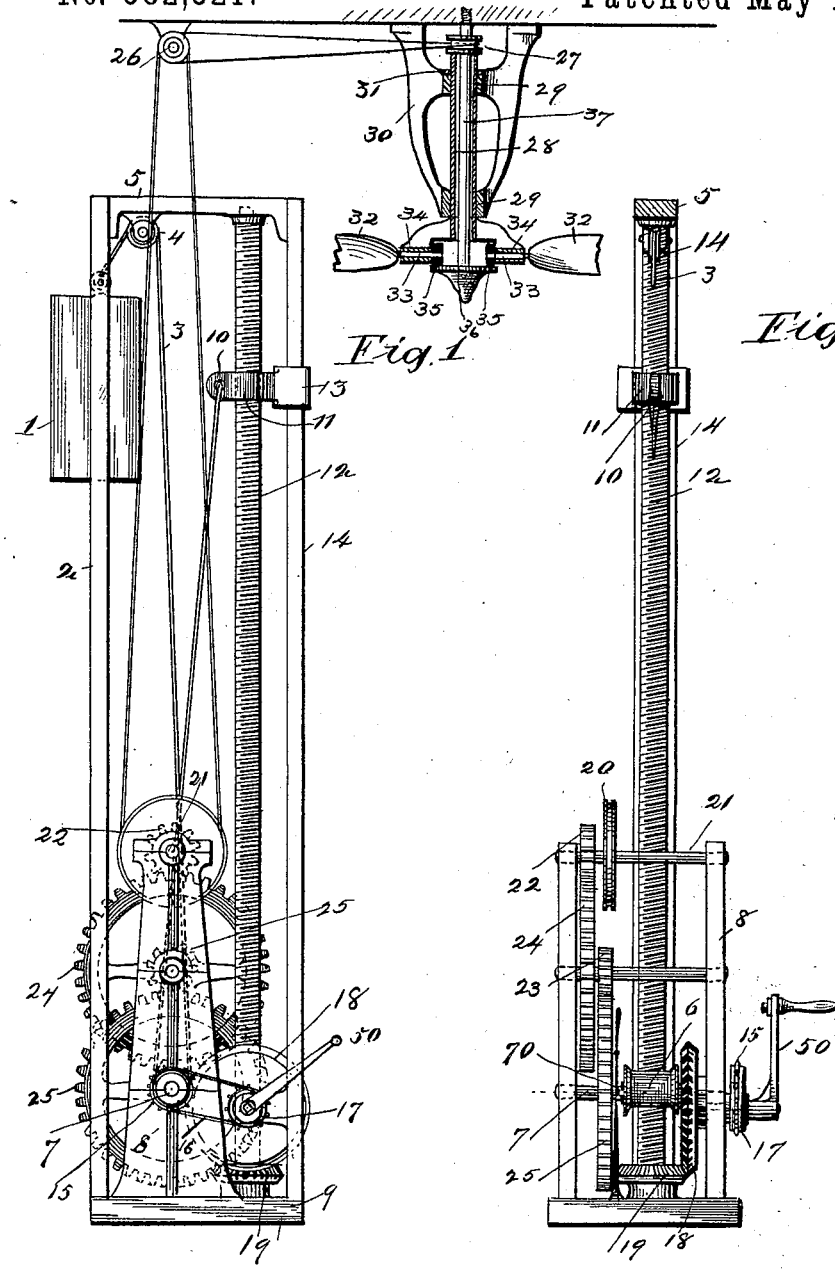

CHARLES G. STICK, OF CLEVELAND, OHIO.

FAN-DRIVING MECHANISM.

SPECIFICATION forming part of Letters Patent No. 582,321, dated May 11, 1897.

Application filed October 14, 1896. Serial No. 608,893. (No model.)

*To all whom it may concern:*

Be it known that I, CHARLES G. STICK, a citizen of the United States, and a resident of Cleveland, county of Cuyahoga, State of Ohio, have invented certain new and useful Improvements in Fan-Driving Mechanism, of which I hereby declare the following to be a full, clear, and exact description, such as will enable others skilled in the art to which it appertains to make and use the same.

My invention relates to improvements in ceiling or wall fans and operating mechanism therefor, with special reference to fans designed for ventilating purposes; and my invention consists in mechanism for operating by mechanical means such fans, and is further designed to operate within specified duration of time.

My invention consists in the operating-weight and intermediate speed mechanism and in the details of construction and arrangement of the various parts, as hereinafter described, shown in the accompanying drawings, and more specifically pointed out in the claim.

In the accompanying drawings, Figure 1 is a side elevation of my driving mechanism, including a view of a rotary fan and of the spindle therefor in vertical section. Fig. 2 is transverse section.

In the views, 1 is a weight vertically moved in guides 2 and provided with a cord 3, which passes over the pulley 4, suspended from the upper arm 5. This cord in turn passes over the drum 6 upon the main driving-shaft 7, mounted upon the standard 8 on the base of the supporting-frame 9, and thence passes upward and is secured to an eye 10 in the nut 11, mounted upon the long vertical screw 12. A guide 13 is sleeved upon the vertical bar 14 and serves to maintain the nut in a position at right angles to the screw.

It is designed that as the weight falls it should rotate the drum and pull down the nut 11 upon the screw. To accomplish this purpose connecting-gear is shown between the driving-shaft and screw, consisting in the sprocket chain and wheels 15, 16, and 17 and beveled gears 18 and 19, by means of which, as the drum rotates, the screw will also rotate at the required degree of speed which will always serve to keep the cord 3 tightly stretched.

A driving-pulley 20 is placed upon the auxiliary shaft 21 at the top of the frame 8, and the speed-gearing consists of pinions 22 and 23 and spur-gears 24 and 25, connecting the shaft 21 with the shaft 7. The cord driving the rotating fan passes over this pulley and one or more intermediate pulleys, as 26, and thence over a pulley 27 upon the fan-spindle 28.

As shown in Fig. 1, the fan-spindle consists in a sleeve mounted in bearings 29 upon the vertical hanger 30. A flange 31 supports this sleeve and rests upon the bearing 29. The fan-vanes 32 are mounted upon short spindles 33 in horizontal bearings 34, secured to the lower extremity of said sleeve, and the rollers 35 upon the inner extremities of the spindles 33 bear upon the upper surface of the disk 36, which is suspended from above by means of the rod 37, passing centrally through the sleeve 28. By means of this construction each separate vane of the frame is made to rotate as the rollers travel upon the surface of the disk while the sleeve is rotating, thus producing a double movement of the fan.

It will be seen that by means of the operating mechanism described the fan will serve as a balance or governor for the gearing, and that by increasing or diminishing the weight the fan can be made to revolve through varying periods of time. In order to again raise the weight to its initial position, it is first necessary to lower the nut upon the screw, which is accomplished by means of the crank 50 and beveled gears 18 and 19, the drum 6 being first thrown out of engagement with the main shaft 7 by means of a clutch, as at 70.

The device in its finished state can be inclosed to prevent injury to the working parts and will occupy small space for storage.

Having described my invention, what I claim as new, and desire to secure by Letters Patent, is—

In mechanism for driving a ventilating-fan, in combination a weight mounted in vertical guides, a drum mounted upon a main driving-shaft, a vertical screw and nut upon said screw, cord secured to said weight passing over a pulley suspended from above said weight and over said drum and secured at the other extremity to a nut moving upon said screw, a geared connection between said driving-drum and said vertical screw, speed-gearing actuated by said driving-shaft, means for lowering the nut upon said screw, and thereby restoring the weight to its initial position, consisting of a crank and bevel-gears and a clutch for disconnecting the drum from the main shaft substantially as and for the purpose described.

Signed at Cleveland, Ohio, this 12th day of September, 1896.

CHARLES G. STICK.

Witnesses:
WM. M. MONROE,
FRANK J. HERN.